United States Patent [19]

Kawana

[11] Patent Number: 5,610,779
[45] Date of Patent: Mar. 11, 1997

[54] FLOPPY DISK DRIVE

[75] Inventor: Jiroh Kawana, Hanamaki, Japan

[73] Assignee: Matsushita Electric Industrial Co., Ltd., Tokyo, Japan

[21] Appl. No.: 253,234

[22] Filed: Jun. 2, 1994

Related U.S. Application Data

[63] Continuation of Ser. No. 928,723, Aug. 13, 1992, abandoned.

[30] Foreign Application Priority Data

| Sep. 6, 1991 | [JP] | Japan | 3-227219 |
| Sep. 11, 1991 | [JP] | Japan | 3-231418 |
| Sep. 11, 1991 | [JP] | Japan | 3-231421 |

[51] Int. Cl.⁶ ............................................. G11B 17/028
[52] U.S. Cl. ........................... 360/99.04; 360/99.05; 360/99.08; 360/99.12; 369/271
[58] Field of Search ................... 360/98.07, 98.08, 360/99.04, 99.05, 99.08, 99.12, 86, 133; 369/270, 271

[56] References Cited

U.S. PATENT DOCUMENTS

| 4,613,921 | 9/1986 | Holmes | 360/99.05 |
| 4,855,850 | 8/1989 | Nagaoka et al. | 360/99.05 |
| 4,873,595 | 10/1989 | Taguchi et al. | 360/99.05 |
| 4,989,107 | 1/1991 | Tsukahara | 360/99.12 |
| 5,121,272 | 6/1992 | Maekawa et al. | 360/99.05 |
| 5,311,383 | 5/1994 | Yokouchi | 360/99.12 |

FOREIGN PATENT DOCUMENTS

| 3-25749 | 2/1991 | Japan | 369/270 |

Primary Examiner—Stuart S. Levy
Assistant Examiner—William R. Korzuch
Attorney, Agent, or Firm—Watson Cole Stevens Davis, P.L.L.C.

[57] ABSTRACT

A floppy disk drive comprises a shaft connected to a rotary shaft of a motor, a rotating disk fixed on the shaft at a center thereof and having a concaved portion formed in a surface thereof and an aperture formed in the concaved portion so as to be opened to a back of the rotating disk, a plate swingably mounted on the rotating disk at a base end portion thereof by means of a pin within the concaved portion, an engaging pin provided at the other end of the plate so as to project over the surface of the rotating disk, and a spring serving to bias the plate radially outwardly of the rotating disk, wherein a center of the pin is arranged on a substantially straight line which passes through a center of the engaging pin and intersects perpendicularly to a straight line connecting the centers of the shaft and the engaging pin. The floppy disk drive may further comprise a biasing device by which the plate is biased toward one of the surface side and the back side of the rotating disk. The spring may be fitted and fixed in a spring receiving groove formed in the surface of the rotating disk.

25 Claims, 8 Drawing Sheets

FLOPPY DISK DRIVE

This application is a continuation of application Ser. No. 07/928,723, filed Aug. 13, 1992 (abandoned).

BACKGROUND OF THE INVENTION

The present invention relates to a drive for floppy disks which is to be used as an auxiliary storage device in a computer, a word processor and the like, and more particularly, to improvements thereof.

A drive for floppy disks which is to be used as an auxiliary storage device in a computer, a word processor and the like comprises, as shown in FIG. 1, a shaft 2 connected to a rotary shaft of a motor and a rotating disk 1 fixed on the shaft 2 at the center thereof. The rotating disk 1 comprises a disk body 1A, an annular magnet 1B adhered to the surface of the disk body 1A, and a hub 3 provided at a center of the disk body. Further, the rotating disk 1 is formed with a concaved portion 4 which extends in the circumferential direction, and the concaved portion 4 is formed with an aperture 5 which is opened to the back of the rotating disk 1. Within the concaved portion 4 is received a plate 6 which extends in the circumferential direction of the rotating disk 1, and the plate 6 is swingably mounted on the rotating disk 1 at a base end portion 6b thereof by a pin 7. An engaging pin 8 is fixed to the other end of the plate 6 such as to project over the surface of the rotating disk 1, and a spring attachment piece 12 which penetrates through the aperture 5 so as to project from the back of the rotating disk 1 is provided at an intermediate portion of the plate 6. A spring attachment pin 13 is provided on the back of the rotating disk 1. A tension spring 14 or a torsion coil spring 15 is stretched between the spring attachment piece 12 and the spring attachment pin 13 (see FIGS. 2 and 4) so that the plate 6 is biased radially outwardly of the rotating disk 1 so as to be brought into contact with an inner wall portion 1a of the concaved portion 4. In consequence, the engaging pin 8 can be positioned at a fixed distance from the center of the rotating disk 1.

On the other hand, as shown in FIG. 6, a floppy disk has a hub 20 formed in the center thereof. The hub 20 is formed with a center hole 21 in the center thereof and an engaging hole 22 at a fixed distance from the center hole 21.

In case of loading the floppy disk, the hub surface of the floppy disk depresses the engaging pin 8 so that the plate 6 is deformed elastically to be pushed in the aperture 5 of the concaved portion 4 and, at the same time, the center hole 21 of the hub 20 of the floppy disk is brought into engagement with the shaft 2 of the rotating disk 1. Subsequently, the rotating disk 1 is rotated slowly as the engaging pin 8 is made to slide on the hub surface of the floppy disk. Then, the engaging pin 8 comes in the engaging hole 22 formed in the hub of the floppy disk so as to be engaged with a contact side n of the engaging hole 22 (see FIG. 7). The engaging pin 8 presses an outer side m away from the shaft 2 due to a component B of a reaction T which results when the engaging pin 8 presses on the contact side n of the engaging hole 22 and a spring force of the tension spring 14 or the torsion coil spring 15. In consequence, the shaft 2 is brought into contact with sides p and g of the center hole 21, so that the floppy disk is located in position (see FIG. 8). At the same time, the elastic restoring force of the plate 6 which acts to keep the hub 20 of the floppy disk apart from the rotating disk 1 can be cancelled. Then, the hub 20 of the floppy disk is magnetically attracted on the annular magnet 1B of the rotating disk 1 so that the engagement between the engaging pin 8 and the engaging hole 22 can be maintained.

In this condition, when the motor is driven, the rotation of the rotating disk 1 is transmitted to the floppy disk through the engaging pin 8, so that the floppy disk is made to rotate together with the rotating disk 1.

On the other hand, as shown in FIG. 6, the position of the outer side m of the engaging hole 22 formed in the hub 20 of the floppy disk with respect to the center hole 21 is defined by JIS and its dimensional tolerance is set relatively loosely. Further, since the pin 7 is located at a distance from the engaging pin 8 in the circumferential direction of the rotating disk 1, the engaging pin 8 is rotated counterclockwise about the pin 7. In this condition, assuming that an amount of dispersion in position of the outer side m of the engaging hole 22 formed in the hub 20 of the floppy disk is f (as shown in FIG. 7), since the engaging pin 8 is rotated counterclockwise about the pin 7, the standard position of the floppy disk is deviated by an angle 8 (see FIG. 8). As a result, the standard position of the floppy disk in the burst direction is varied greatly, resulting in the read error in some cases.

Further, the standard position in the burst direction is caused to be varied owing to the following reasons as well. As shown in FIG. 5, the base end portion 6b of the plate 6 loosely engages with a shaft portion 7b of the pin 7 and, in addition, a gap between a head portion 7a of the pin 7 and the rotating disk 1 is made larger than the thickness of the plate 6. For this reason, the base end portion 6b of the plate 6 cannot be made steady between the head portion 7a of the pin 7 and the rotating disk 1, so that the engaging pin 8 is fitted in the engaging hole 22 deeper or shallower than the position shown in FIG. 5 and it is not settled. More specifically, in the state where the engaging pin 8 is fitted in deeply as shown in FIG. 9, the engaging pin 8 is inclined toward the trailing side of the rotating direction of the rotating disk 1, so that its engaging position with the engaging hole 22 of the floppy disk deviates by +x from the position shown in FIG. 5, while in the state where the engaging pin 8 is fitted in shallower as shown in FIG. 10, the engaging pin 8 is inclined toward the leading side of the rotating direction of the rotating disk 1, so that its engaging position with the engaging hole 22 of the floppy disk deviates by −x from the position shown in FIG. 5. In consequence, in this case as well, there arises a problem that the standard position of the floppy disk in burst direction is varied greatly when the floppy disk is rotated.

On the other hand, since there is mounted the tension spring 14 or the torsion coil spring 15 between the spring attachment piece 12 which penetrates through the aperture 5 of the rotating disk 1 so as to project from the back of the rotating disk 1 and the spring attachment pin 13 which is provided on the back of the rotating disk 1, it is necessary to provide a sufficiently large space adjacent to the back of the rotating disk 1 in order to prevent the spring from interfering with the motor. Therefore, the floppy disk drive is increased in size.

Accordingly, a first object of the present invention is to provide a floppy disk drive which is capable of minimizing the variation in standard position in the burst direction and occurrence of the read error.

A second object of the present invention is to provide a floppy disk drive the size of which is compact, particularly, the height of which is decreased.

SUMMARY OF THE INVENTION

A floppy disk drive according to an aspect of the present invention comprises a shaft connected to a rotary shaft of a motor, a rotating disk fixed on the shaft at the center thereof and having a concaved portion formed in the surface thereof and an aperture formed in the concaved portion so as to be opened to the back of the rotating disk, a plate swingably mounted on the rotating disk at the base end portion thereof by means of a pin within the concaved portion, an engaging pin provided at the other end of the plate so as to project over the surface of the rotating disk, and a spring serving to bias the plate radially outwardly of the rotating disk, wherein the center of the pin is arranged on a substantially straight line which passes through the center of the engaging pin and intersects perpendicularly to a straight line connecting the centers of the shaft and the engaging pin.

With this construction, it is possible to reduce an amount of movement of the engaging pin in burst direction resulting from the variation in position of the engaging hole of the floppy disk. It is therefore possible to decrease the dispersion in the standard position of the floppy disk in the burst direction.

In a floppy disk drive according to another aspect of the present invention, there is provided a biasing device by which the plate is biased toward one of the surface side and the back side of the rotating disk.

The biasing device can comprise a leaf spring which is fixed to the back surface of the rotating disk and serves to bias the plate toward the surface side of the rotating disk. Further, the biasing device may comprise a support projection portion which is provided in the concaved portion of the rotating disk so as to project toward the surface side of the rotating disk and on the surface of which the plate is allowed to slide. Still further, the biasing device may comprise a bent portion which is formed by bending a base end portion of the plate toward the rotating disk and is allowed to slide on the surface of the rotating disk.

With such construction, the backlash of the plate between the head portion of the pin and the rotating disk can be avoided, so that the engaging pin can be prevented from being fitted in the engaging hole deeply or slightly in an unstable manner. In consequence, it is possible to decrease the variation in standard position of the floppy disk in the burst direction.

In a floppy disk drive according to still another aspect of the present invention, the spring serving to bias the plate radially outwardly of the rotating disk is fitted and fixed at the base end portion thereof in a spring receiving groove formed in the surface of the rotating disk and engaged at the forward end portion thereof with the plate.

With this construction, it becomes unnecessary to provide a large space adjacent to the back of the rotating disk unlike the prior art, and therefore, it becomes possible to make the floppy disk drive compact.

DESCRIPTION OF THE PREFERRED EMBODIMENTS

Figure 11:
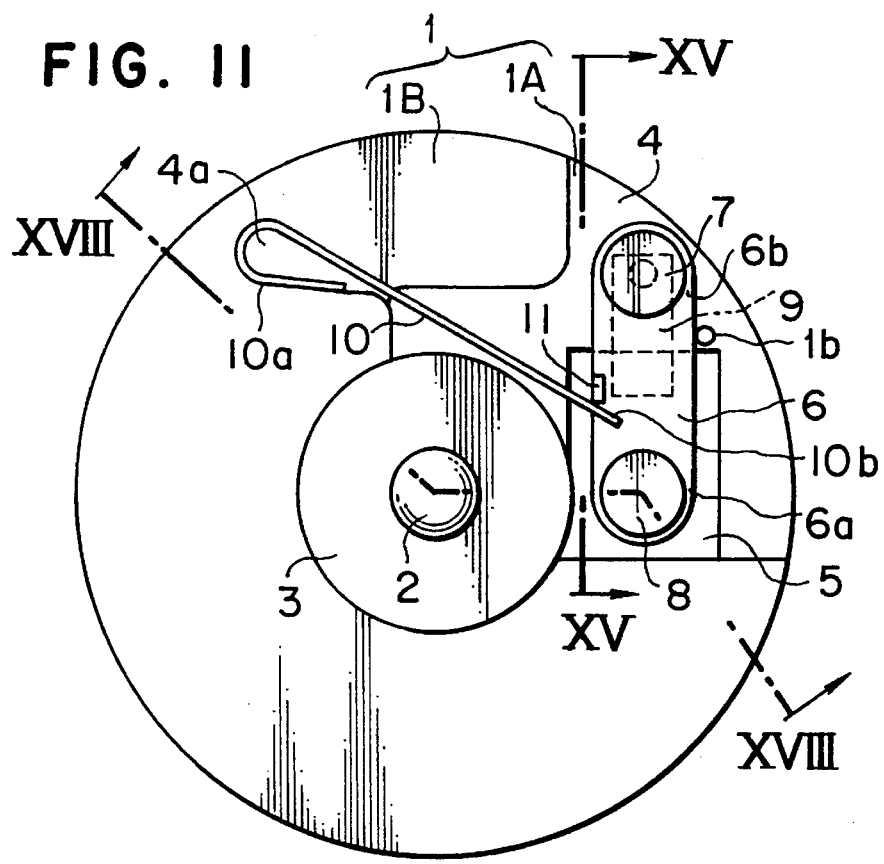
FIG. 11 is a plan view of a floppy disk drive according to the present invention.
Figure 12:
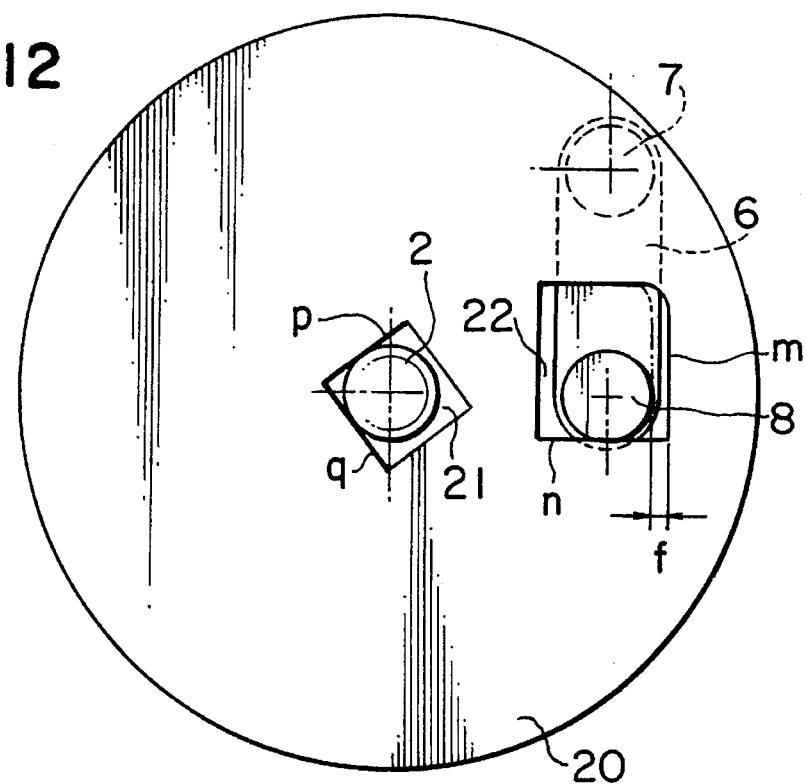
FIG. 12 is a plan view of the hub of the floppy disk and the drive according to the present invention when the floppy disk is loaded.

A drive for floppy disks according to the present invention comprises, as shown in FIG. 11, a shaft 2 connected to a rotary shaft of a motor and a rotating disk 1 fixed on the shaft 2 at the center thereof. The rotating disk 1 comprises a disk body 1A, an annular magnet 1B adhered to a surface of the disk body 1A, and a central hub 3. Further, the rotating disk 1 is formed with a concaved portion 4 in which an aperture 5 is formed so as to be opened to a back of the rotating disk 1. Within the concaved portion 4 is received a plate 6 which in turn is swingably mounted on the rotating disk 1 at a base end portion 6b thereof by means of a pin 7. An engaging pin 8 is fixed to the other end 6a of the plate 6 so as to project over the surface of the rotating disk 1, and a spring bracket 11 which projects toward the surface side of the rotating disk 1 is provided at an intermediate portion of the plate 6.

A spring receiving groove 4a is formed in the surface of the rotating disk 1. A base end portion 10a of a spring 10 is fitted and fixed in the spring receiving groove 4a (see FIG. 18), while a tip end portion 10b of the spring 10 is engaged with the spring bracket 11. Namely, the spring 10 acts to bias the plate 6 radially outwardly of the rotating disk 1 so that the plate 6 abuts on a stopper 1b provided in the concaved portion 4. In consequence, the engaging pin 8 can be positioned at a predetermined distance from the center of the rotating disk 1.

The center of the pin 7 is arranged on a substantially straight line which passes through the center of the engaging pin 8 and intersects perpendicularly to a straight line connecting the centers of the shaft 2 and the engaging pin 8.

Figure 15:
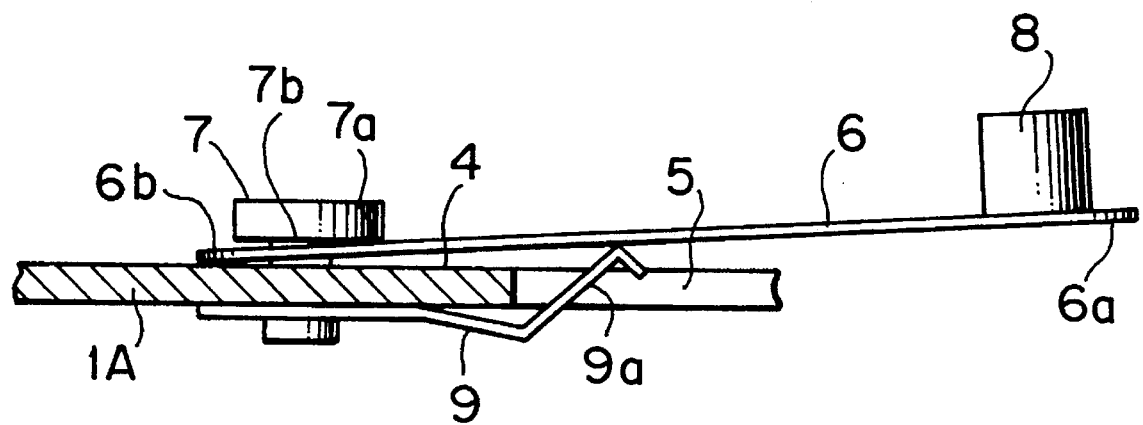
FIG. 15 is a sectional view taken along the line XV—XV of FIG. 11.

A leaf spring 9 is fixed to the back of the rotating disk 1 as shown in FIG. 15 so that a forward end portion 9a of the leaf spring 9 is passed through the aperture 5 so as to bias the plate 6 toward the surface side of the rotating disk 1.

Figure 1:
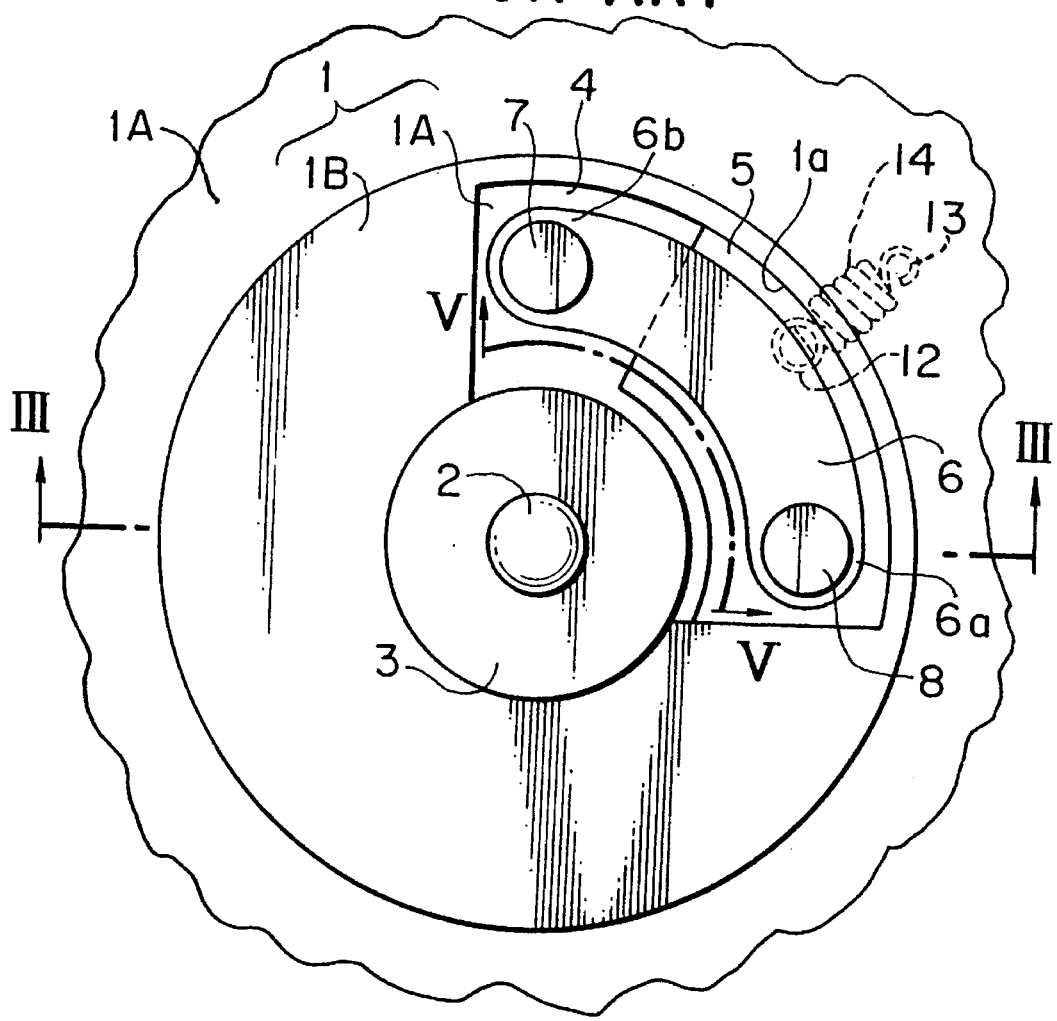
FIG. 1 is a plan view of a floppy disk drive according to a prior art.
Figure 3:
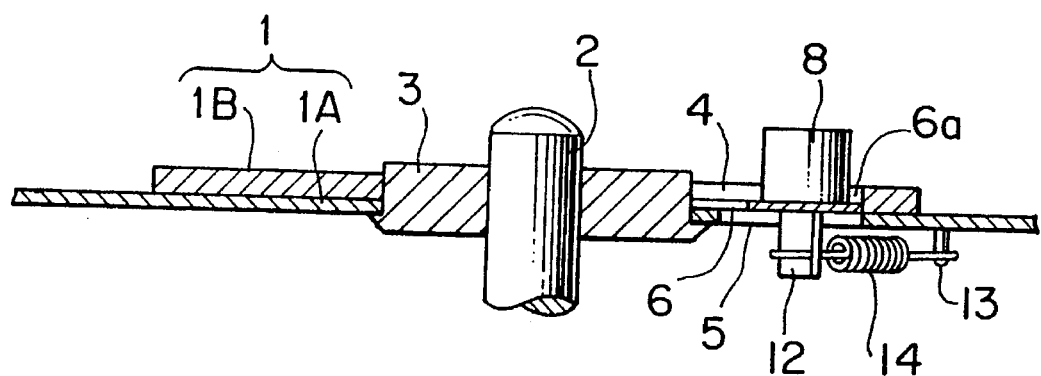
FIG. 3 is a sectional view taken along line III—III of FIG. 1.
Figure 2:
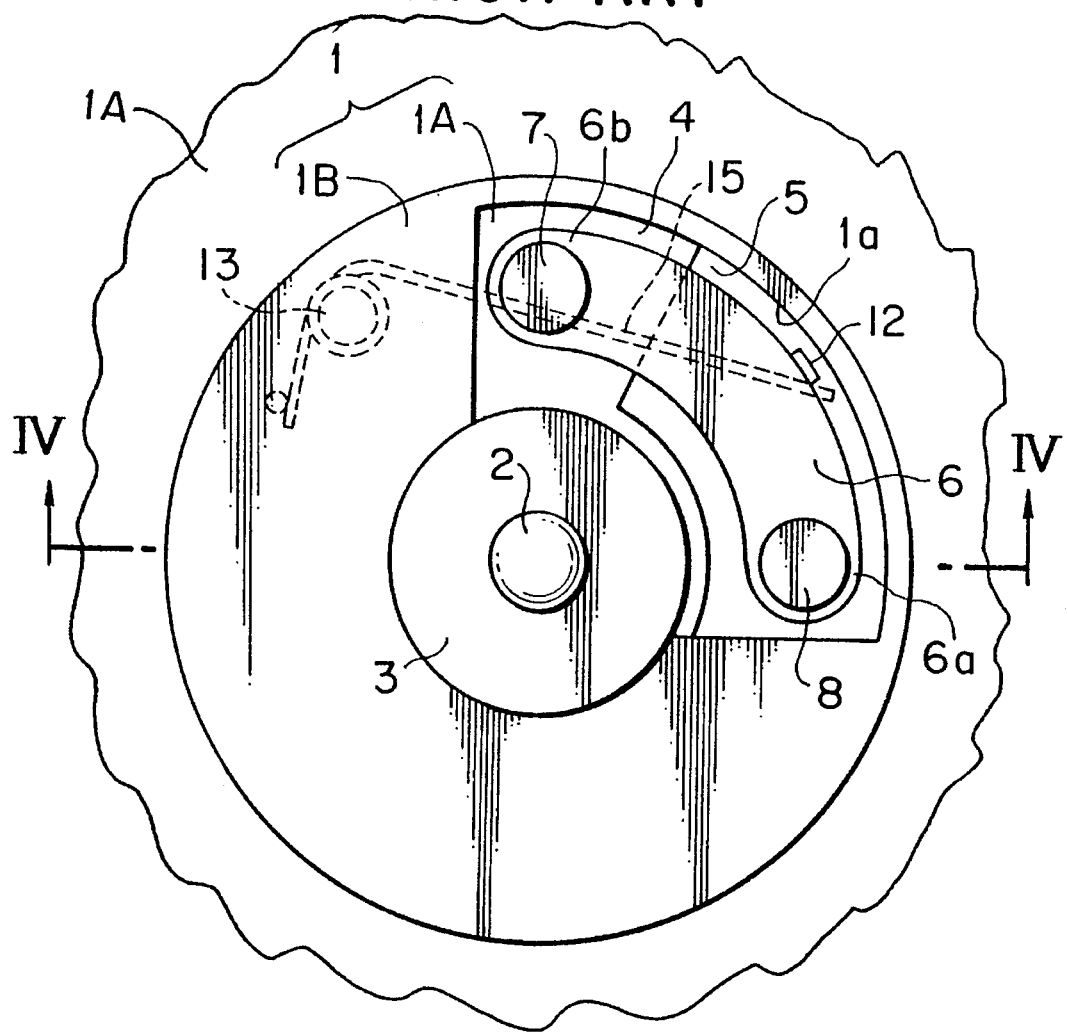
FIG. 2 is a plan view of another floppy disk drive according to another prior art.
Figure 4:
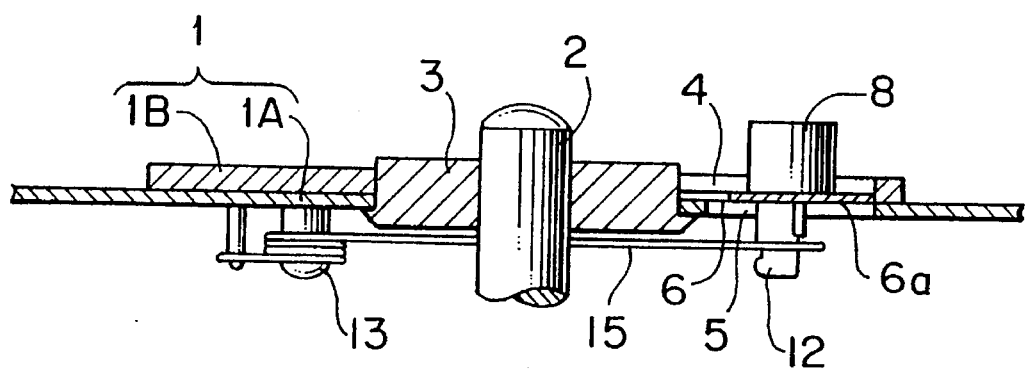
FIG. 4 is a sectional view taken along line IV—IV of FIG. 2.
Figure 5:
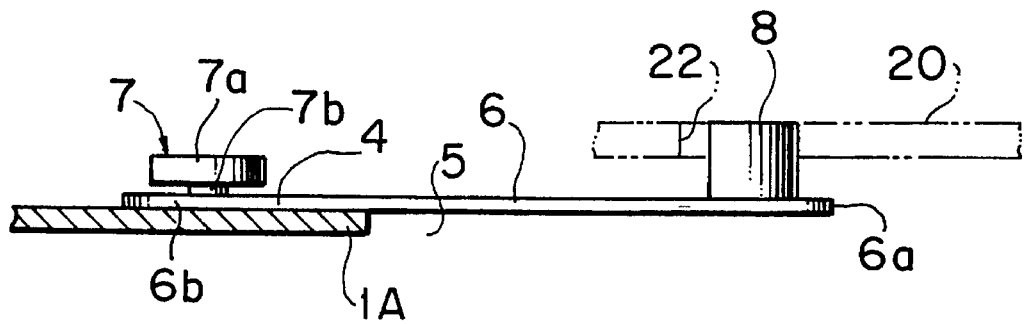
FIG. 5 is a sectional view taken along line V—V of FIG. 1.
Figure 6:
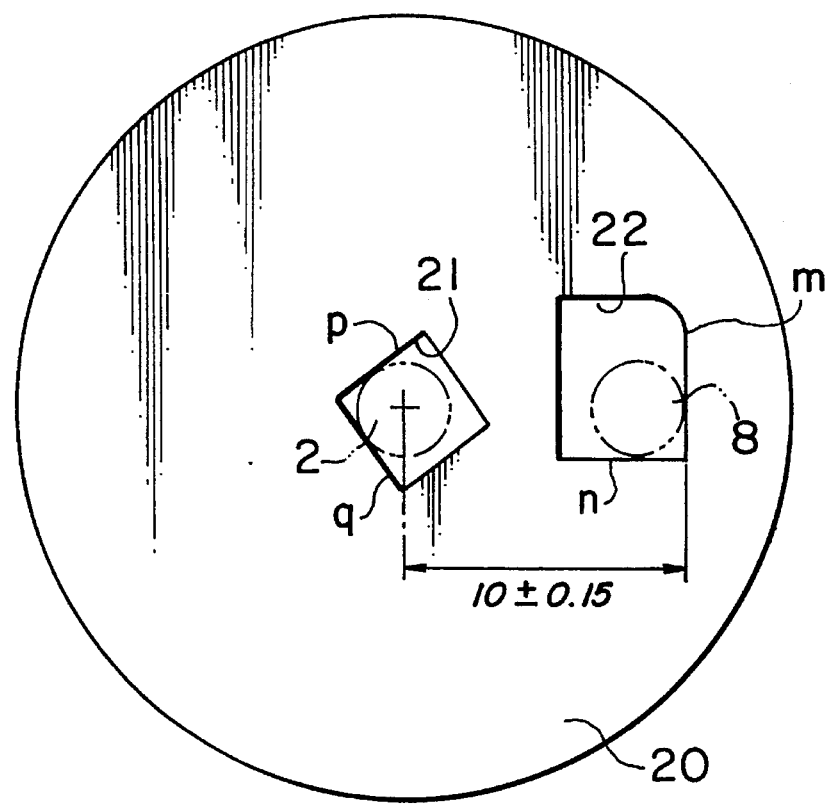
FIG. 6 is a plan view of a hub of a floppy disk according to the prior art.
Figure 7:
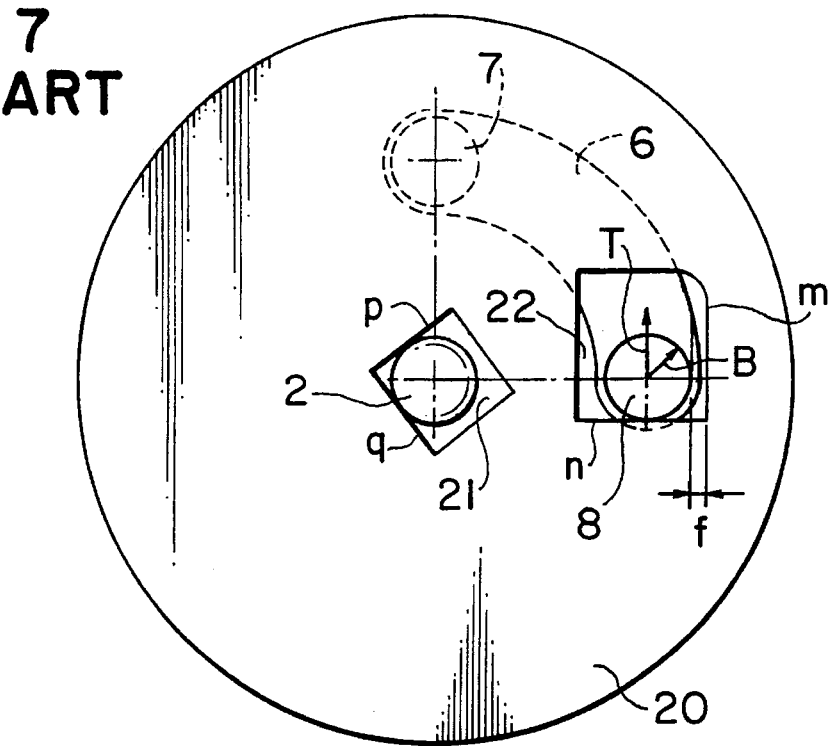
FIG. 7 is a plan view of the hub of the floppy disk and the drive according to the prior art when the floppy disk is loaded.
Figure 8:
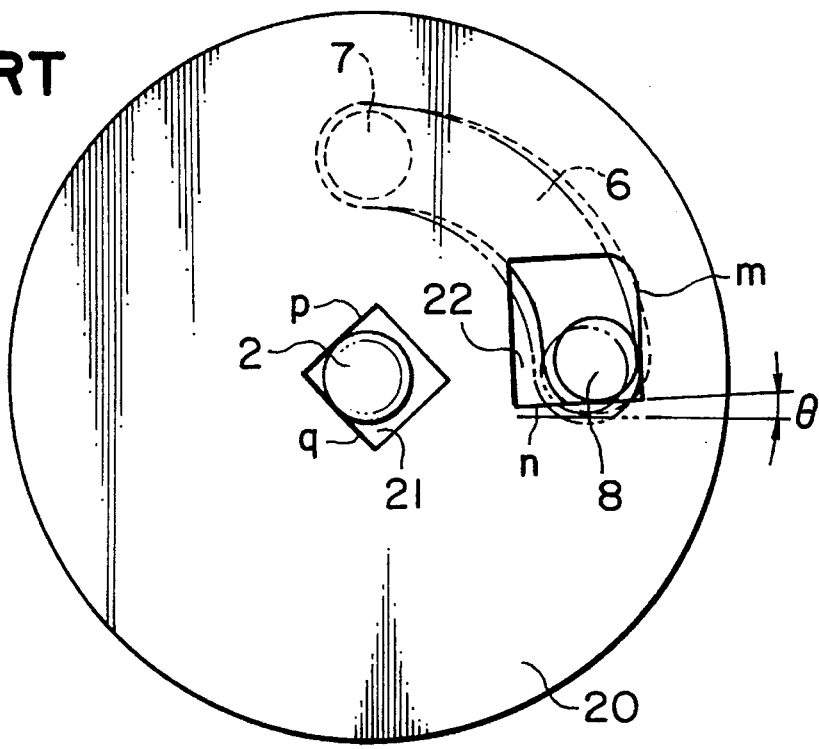
FIG. 8 is a plan view showing the variation in standard position of the floppy disk in the burst direction according to the prior art.
Figure 9:
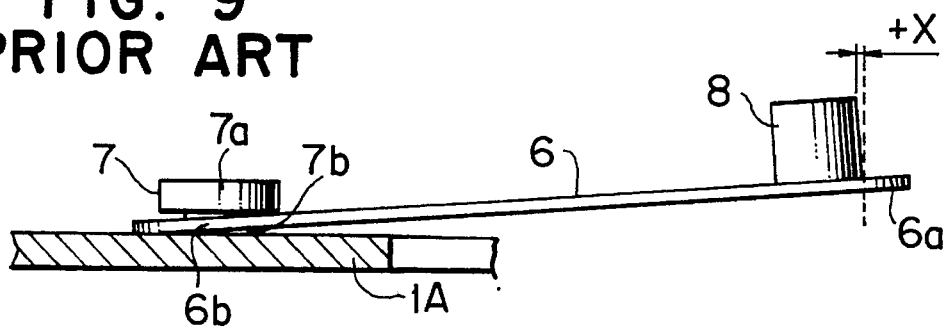
FIGS. 9 and 10 are sectional views similar to FIG. 5 but showing the states where an engaging pin is fitted in an engaging hole deeply and slightly, respectively.
Figure 10:
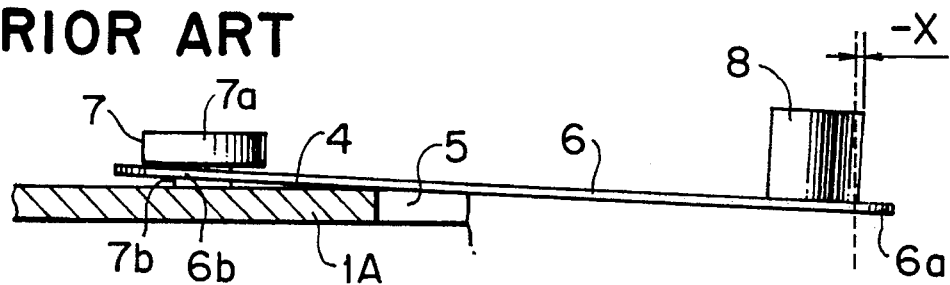
Figure 13:
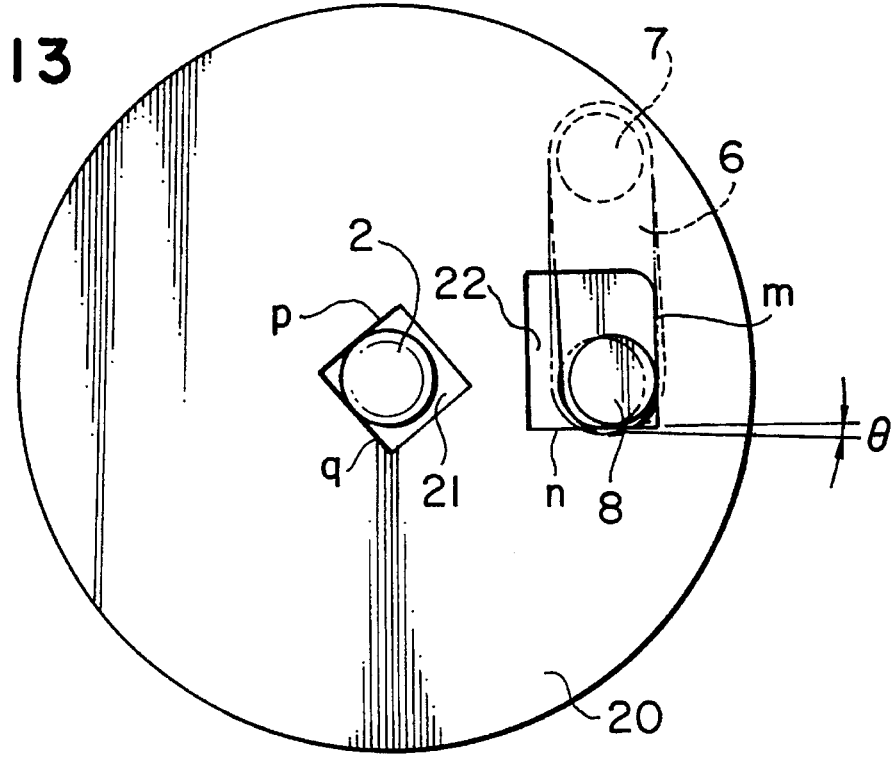
FIG. 13 is a plan view showing the variation in standard position of the floppy disk in the burst direction according to the present invention.

When the floppy disk is loaded on the drive (see FIG. 2), the engaging pin 8 comes in an engaging hole 22 of the floppy disk and presses on a contact side n of the engaging hole 22. At the same time, the engaging pin 8 is displaced radially outwardly of the rotating disk 1 due to the spring force of the spring 10 so as to press an outer side m outwardly. Since the center of the pin 7 is arranged on the substantially straight line which passes through the center of the engaging pin 8 and intersects perpendicularly to the straight line connecting the centers of the shaft 2 and the engaging pin 8 as mentioned above, the variation f in position of the engaging hole 22 causes the engaging pin 8 only to move outwardly on the line connecting the engaging pin 8 and the shaft 2. Namely, an amount of movement of the engaging pin in the burst direction becomes small (see FIG. 13). In consequence, the variation in the standard position of the floppy disk in the burst direction can be made small.

Further, since the leaf spring 9 biases the plate 6 toward the upper surface side of the rotating disk 1, the backlash between a head portion 7a of the pin 7 and the plate 6 can be prevented, thereby maintaining the engaging pin 8 substantially in a fixed position. Accordingly, the engaging pin 8 is allowed to enter the engaging hole 22 in the regular position, and hence, it is possible to reduce the variation in standard position of the floppy disk in the burst direction.

Figure 16:
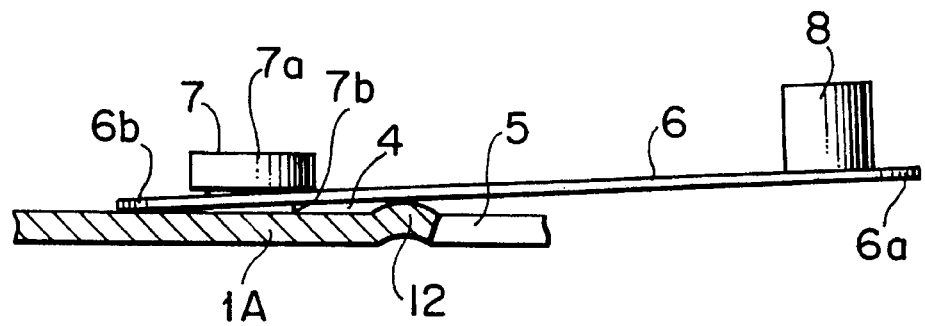
FIGS. 16 and 17 are sectional views similar to FIG. 5 but showing other embodiments of the present invention, respectively.

In place of the leaf spring 9 shown in FIG. 15, it is possible to form, at the end portion of the aperture 5 of the rotating disk 1, a support projection portion 12 which projects toward the surface of the rotating disk 1 and on which the plate 6 is allowed to slide as shown in FIG. 16.

Figure 17:
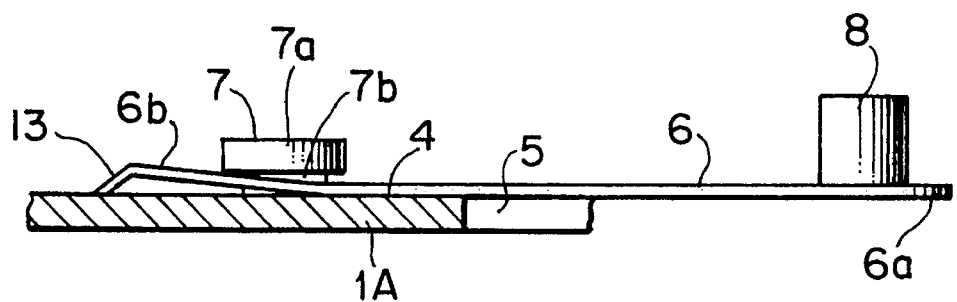

Further, as shown in FIG. 17, the base end portion 6b of the plate 6 may be extended in the opposite direction to the engaging pin 8 so as to form a bent portion 13 which serves to press on the surface of the rotating disk. In this case, the plate 6 is pressed toward the back of the rotating disk 1 so that the backlash between the head portion 7a of the pin 7 and the plate 6 can be prevented.

Figure 18:
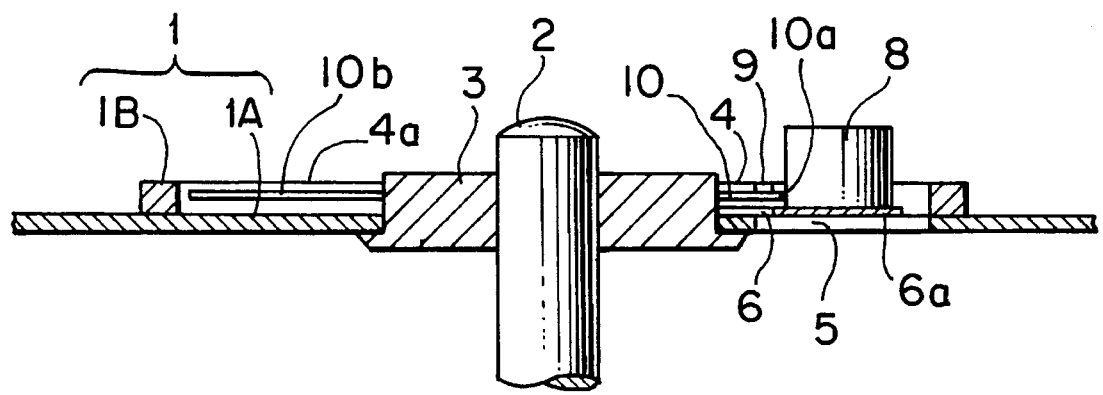
FIG. 18 is a sectional view taken along the line XVIII—XVIII of FIG. 11.

In addition, as shown in FIG. 18, since the spring 10 which serves to bias the plate 6 radially outwardly of the rotating disk is fitted and fixed in the spring receiving groove 4a formed in the surface of the rotating disk 1, there is provided no projection on the back side of the rotating disk, thereby making it possible to dispose the motor close to the rotating disk 1. As a result, it is possible to reduce the height of the drive.

In the embodiments described above, the center of the pin 7 has been described as being arranged on the substantially straight line which passes through the center of the engaging pin 8 and intersects perpendicularly to the straight line connecting the centers of the shaft 2 and the engaging pin 8, but, this requirement does not always need to be satisfied in special cases. An example of such case will be described hereinafter.

Figure 14:
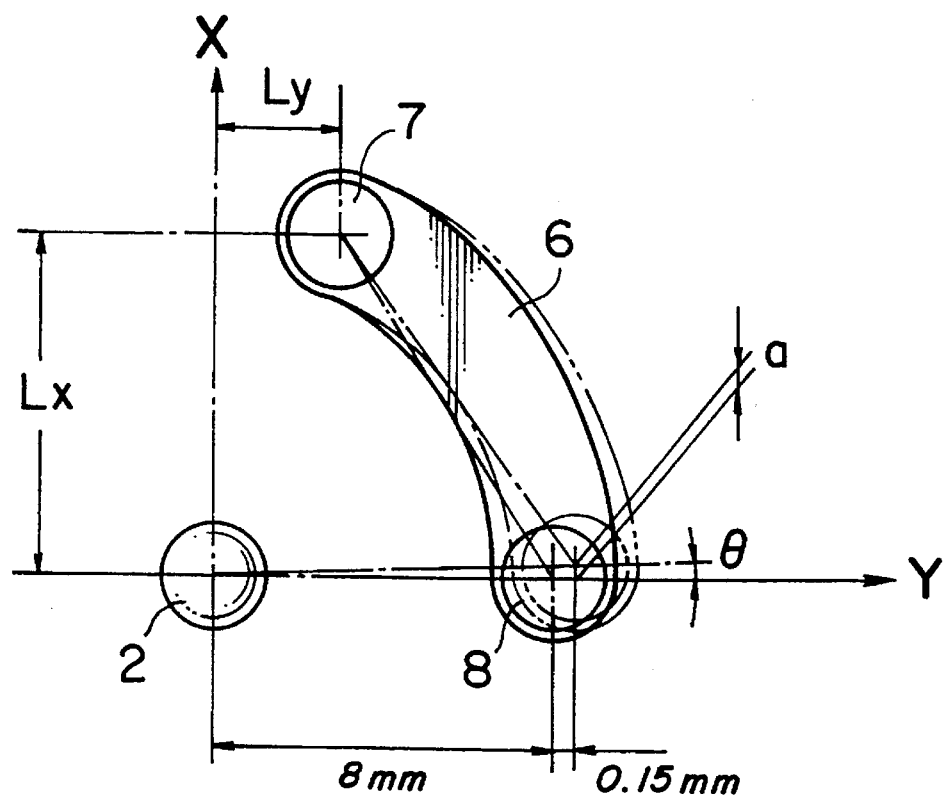
FIG. 14 is an illustration used to obtain an equation for defining the position of a pin of the floppy disk drive according to the present invention.

Referring to FIG. 14, the straight line connecting the centers of the shaft 2 and the engaging pin 8 is rendered as the Y coordinate axis, while a straight line passing through the center of the shaft 2 and intersecting perpendicularly to the Y coordinate axis is rendered as the X coordinate axis. It is assumed that the engaging hole 22 of the floppy disk has the Y and X coordinates (8 mm, 0 mm), the variation in Y-axis direction is 0.15 mm, the time required for one revolution of the floppy disk is 200 msec, and the tolerance of variation in standard position is within 200 μs.

The angle θ corresponding to the tolerance of variation in standard position, 200 μs, is obtained in accordance with the following equations.

$$\theta:360° = 200\ \mu s:200\ msec$$

$$\theta = 200\mu s \times 360° \div 200\ msec$$

$$\theta = 0.36°$$

In order to make the positional deviation smaller than 200 μs, the following equation should be satisfied, $$\theta \leq 0.36° \qquad \text{equation 1}$$

From FIG. 14, the following equation is established.

$$a = (8+0.15)\tan\theta \qquad \text{equation 2}$$

Assuming that the position of the pin 7 is (Lx, Ly), since the length L of the plate 6 is fixed, the following equation is established.

$$\begin{aligned} L^2 &= (8-Ly)^2 + Lx^2 \qquad \text{equation 3}\\ &= (8+0.15-Ly)^2 + (Lx-a)^2 \end{aligned}$$

Substituting equation 2 into equation 3, the following equations can be obtained.

$$(8-Ly)^2 + Lx^2 = (8+0.15-Ly)^2 + (Lx-8.15\tan\theta)^2$$

$$(16.3\tan\theta)Lx = (8.15)^2 - 64 + (8.15\tan\theta)^2 - 0.3Ly$$

Substituting equation 1, the following equation is established.

$$Lx \leq 24.25\ mm - 3Ly$$

In the above-described special case, the pin 7 may be provided anywhere so far as the above equation can be satisfied.

What is claimed is:

1. A floppy disk device comprising:
   a shaft connected to a rotary shaft of a motor;
   a first disk fixed on said shaft at a center of said first disk and having a concave portion formed in a surface of said first disk on which a floppy disk is to be mounted and an aperture formed in said concave portion so as to be opened to a back of the first disk;
   a plate swingably mounted on said first disk at a base end portion of said plate by means of a mounting pin disposed at said concave portion;
   an engaging pin provided at another end portion of said plate so as to project over said surface of said first disk; and
   a spring serving to bias said plate radially outwardly of said first disk, said spring being fitted and fixed at a base portion thereof in a spring receiving groove formed in said surface of said first disk on which the floppy disk is to be mounted and said spring being engaged at a forward end portion thereof with said plate;
   wherein a center of said mounting pin is arranged on a substantially straight line which passes through a center of said engaging pin and which intersects perpendicularly to a straight line connecting the centers of said shaft and said engaging pin.

2. The floppy disk drive according to claim 1, further comprising a biasing device by which said plate is biased toward one of the surface side and the back side of said first disk.

3. The floppy disk drive according to claim 2, wherein said biasing device comprises a leaf spring which is fixed to the back of said first disk and serves to bias said plate toward the surface of said first disk.

4. The floppy disk drive according to claim 2, wherein said biasing device comprises a support projection portion which is provided in said concave portion of said first disk so as to project toward the surface of said first disk and on the surface of which said plate is allowed to slide when said first disk rotates.

5. The floppy disk drive according to claim 2, wherein said biasing device comprises a bent portion which is formed by bending a base end portion of said plate toward said first disk and is allowed to slide on the surface of said first disk when said first disk rotates.

6. The floppy disk device according to claim 1, wherein said base portion of said spring is confined within said spring receiving groove.

7. The floppy disk device according to claim 1, wherein said spring comprises said base portion and a straight, non-coiled portion which extends from said spring receiving groove.

8. A floppy disk drive comprising:

a shaft connected to a rotary shaft of a motor;

a first disk fixed on said shaft at a center of said first disk and having a concave portion formed in a surface of said first disk on which a floppy disk is to be mounted and an aperture formed in said concave portion so as to be opened to a back side of the first disk;

a mounting pin provided at said concave portion;

a plate swingably mounted on said first disk at a base end portion of said plate by means of said mounting pin;

an engaging pin provided at another end of said plate so as to project over said surface of said first disk;

a spring serving to bias said plate radially outwardly of said first disk, said spring being fitted and fixed at a base portion thereof in a spring receiving groove formed in said surface of said first disk on which the floppy disk is to be mounted and said spring being engaged at a forward end portion thereof with said plate; and a biasing device by which said plate is biased toward one of said surface and said back side of said first disk;

wherein said biasing device comprises a support projection portion which is provided at said concave portion of said first disk so as to project toward said surface of said first disk and on which said plate is allowed to slide when said first disk rotates.

9. The floppy disk device according to claim 8, wherein said base portion of said spring is confined within said spring receiving groove.

10. The floppy disk device according to claim 8, wherein said spring comprises said base portion and a straight, non-coiled portion which extends from said spring receiving groove.

11. A floppy disk drive comprising:

a shaft connected to a rotary shaft of a motor;

a first disk fixed on said shaft at a center of said first disk and having a concave portion formed in a surface of said first disk on which a floppy disk is to be mounted and an aperture formed in said concave portion so as to be opened to a back side of the first disk;

a mounting pin provided at said concave portion;

a plate swingably mounted on said first disk at a base end portion of said plate by means of said mounting pin;

an engaging pin provided at another end of said plate so as to project over said surface of said first disk;

a spring serving to bias said plate radially outwardly of said first disk, said spring being fitted and fixed at a base portion thereof in a spring receiving groove formed in the surface of said first disk on which the floppy disk is to be mounted and said spring being engaged at a forward end portion thereof with said plate; and a biasing device by which said plate is biased toward one of said surface and said back side of said first disk;

wherein said biasing device comprises a bent portion which is formed by bending said base end portion of said plate toward said first disk and which is allowed to slide on said surface of said first disk when said first disk rotates.

12. The floppy disk device according to claim 11, wherein said bent portion is disposed on a side of said mounting pin remote from said engaging pin.

13. The floppy disk device according to claim 12, wherein said biasing device biases said plate toward a back side of said first disk.

14. The floppy disk device according to claim 11, wherein said base portion of said spring is confined within said spring receiving groove.

15. The floppy disk device according to claim 11, wherein said spring comprises said base portion and a straight, non-coiled portion which extends from said spring receiving groove.

16. A floppy disk drive comprising:

a shaft connected to a rotary shaft of a motor;

a first disk fixed on said shaft at a center of said first disk and having a concave portion formed in a surface of said first disk on which a floppy disk is to be mounted and an aperture formed in said concave portion so as to be opened to a back side of the first disk;

a plate swingably mounted on said first disk at a base end portion of said plate by means of a pin provided at said concave portion;

an engaging pin provided at another end portion of said plate so as to project over said surface of said first disk; and a spring serving to bias said plate radially outwardly of said first disk, said spring being fitted and fixed at a base portion thereof in a spring receiving groove formed in said surface of said first disk on which the floppy disk is to be mounted and said spring being engaged at a forward end portion thereof with said plate.

17. The floppy disk device according to claim 16, wherein said base portion of said spring is confined within said spring receiving groove.

18. The floppy disk device according to claim 16, wherein said spring comprises said base portion and a straight, non-coiled portion which extends from said spring receiving groove.

19. A floppy disk drive comprising:

a shaft connected to a rotary shaft of a motor;

a first disk fixed on said shaft at a center of said first disk and having a concave portion formed in a surface of said first disk on which a floppy disk is to be mounted and an aperture formed in said concave portion so as to be opened to a back side of the first disk;

a mounting pin provided at said concave portion;

a plate swingably mounted on said first disk at a base end portion of said plate by means of said mounting pin;

an engaging pin provided at another end of said plate so as to project over said surface of said first disk;

a spring serving to bias said plate radially outwardly of said first disk; and a biasing device by which said plate is biased toward one of said surface and said back side of said first disk;

wherein said spring is fitted and fixed at a base end portion thereof in a spring receiving groove formed in said surface of said first disk on which said floppy disk is to be mounted and said spring is engaged at a forward end portion thereof with said plate.

20. The floppy disk drive according to claim 19, wherein said biasing device comprises a leaf spring which is fixed to the back to said first disk and serves to bias said plate toward the surface of said first disk.

21. The floppy disk device according to claim 19, wherein said base end portion of said spring is confined within said spring receiving groove.

22. The floppy disk device according to claim 19, wherein said spring comprises said base end portion and a straight, non-coiled portion which extends from said spring receiving groove.

23. A floppy disk drive comprising:

a shaft connected to a rotary shaft of a motor;

a first disk fixed on said shaft at a center of said first disk and having a concave portion formed in a surface of said first disk on which a floppy disk is to be mounted and an aperture formed in said concave portion so as to be opened to a back side of the first disk;

a plate swingably mounted on said first disk at a base end portion of said plate by means of a pin provided at said concave portion;

an engaging pin provided at another end of said plate so as to project over said surface of said first disk; and a spring serving to bias said plate radially outwardly of said first disk, said spring being fitted and fixed at a base portion thereof in a spring receiving groove formed in the surface of said first disk on which the floppy disk is to be mounted and said spring being engaged at a forward end portion thereof with said plate; wherein:

when a straight line connecting the centers of said shaft and said engaging pin is rendered as the Y coordinate axis, a straight line passing through the center of said shaft and intersecting perpendicularly to said Y coordinate axis is rendered as the X coordinate axis, an engaging hole of the floppy disk has X and Y coordinates (8 mm, 0 mm), a variation in a Y-axis direction is 0.15 mm, and a variation in a standard position of the floppy disk is within 200 µs, a center of said pin is located at a position which satisfies the following equation:

$$Lx \leq 24.25\ mm - 3Ly$$

where Lx and Ly represent the X and Y coordinates of the center of the pin, respectively.

24. The floppy disk device according to claim 23, wherein said base portion of said spring is confined within said spring receiving groove.

25. The floppy disk device according to claim 23, wherein said spring comprises said base portion and a straight, non-coiled portion which extends from said spring receiving groove.

\* \* \* \* \*